United States Patent [19]
Wasserman

[11] Patent Number: 5,454,187
[45] Date of Patent: Oct. 3, 1995

[54] PLANT TENDER

[76] Inventor: Kurt J. Wasserman, P.O. Box 77, Port Jervis, N.Y. 12771

[21] Appl. No.: 99,240

[22] Filed: Jul. 29, 1993

Related U.S. Application Data

[63] Continuation-in-part of Ser. No. 955,988, Oct. 2, 1992.
[51] Int. Cl.$^6$ ................................................ A47G 7/00
[52] U.S. Cl. ............................................. 47/39; 47/66
[58] Field of Search ................... 47/39, 66 C, 41.01

[56] References Cited

U.S. PATENT DOCUMENTS

| | | | |
|---|---|---|---|
| 422,297 | 2/1890 | Covington | 47/39 |
| 1,743,987 | 1/1930 | Tinaglia | 47/66 C |
| 3,018,898 | 1/1962 | Frazelle | 47/39 |
| 3,030,735 | 4/1962 | Bodkins | 47/39 |
| 4,551,943 | 11/1985 | Pas | 47/39 |
| 5,241,781 | 9/1993 | Malczyk | 47/39 |
| 5,251,399 | 10/1993 | Rasmussen | 47/39 |

FOREIGN PATENT DOCUMENTS

| | | | |
|---|---|---|---|
| 87442 | 6/1977 | Australia | 47/39 |
| 47788 | 4/1966 | U.S.S.R. | 47/39 |
| 6451 | 3/1906 | United Kingdom | 47/39 |

OTHER PUBLICATIONS

Ikea Systems, B. V., advertisement "Bring Back the Dead", N. Y. Times, May 31, 1992 at 14 (N.J. ed.).
General Elec. Co. Miser® Circlite™ package panel (undated).
Gro Lite™ advertisement, Solutions catalog, Christmas 1991 at 8 (Solutions, P.O. Box 6878, Portland OR 97228).
Acu–Drip® watering system advertisement (Wade Rain®) (undated).
J. U. Crockett, *Flowering House Plants* (Time–Life Encyclopedia of Gardening), at 7, 10, 11, 30–33, 78, 79, 82, 86 (1972).

*Primary Examiner*—Ramon S. Britts
*Assistant Examiner*—Joanne C. Downs
*Attorney, Agent, or Firm*—Kuhn and Muller

[57] ABSTRACT

A plant tender delivers light to the foliage and water and nutrients to the roots of a plant growing in a container and embedded in an anchoring medium contained in the container. The plant tender has an armature positioned adjacent to the plant and formed with a conduit for electrical power. A reservoir is provided in physical contact with the container, armature or anchoring medium. The reservoir supplies water and nutrients to the roots. An artificial light source is supported by the armature and irradiates the foliage. A controller establishes a duty cycle of the light source and controls both the duty cycle and the delivery of water and nutrients. In certain embodiments, the positions of the plants and lights can be adjusted, and fish are grown in symbiotic relation to the plants.

3 Claims, 11 Drawing Sheets

PLANT TENDER

CROSS-REFERENCE TO RELATED APPLICATION

This is a continuation-in-part of application Ser. No. 07/955,988, filed Oct. 2, 1992, for "Plant Tender," now allowed.

BACKGROUND OF THE INVENTION

1. Field of the Invention

This invention relates to plant tenders and more particularly to a novel and highly effective plant tender that automatically tends plants, especially indoor plants, for extended periods without the attention of a human attendant.

2. Description of the Prior Art

Plants are essential for many reasons, including human survival. In general, outdoor plants fend for themselves, though of course under certain circumstances they must be irrigated, weeded, pruned, or otherwise tended in order to survive or in order to conform to human designs. Farm crops, orchards, and vegetable and flower gardens are examples of outdoor plants that require, or at any rate often receive, regular tending by humans. It is indoor plants, however, that require the most assiduous tending. Many indoor plants are adapted to thrive with little water and light, but all need some of each in order to survive, and indoors there is no rain and often little light. Indoor plants must therefore be watered and either placed in a room with a window, skylight or other means for admitting outdoor light or irradiated with artificial light.

Despite the need to tend indoor plants, they have always been very popular. People have always agreed that they can provide beauty and a pleasant aroma; and today many value them for their ability to absorb pollutants, thereby purifying the air.

Indoor plants now assume increased importance because of the recent emphasis on "tight" construction of houses, office buildings and other buildings in order to conserve energy. Modern construction admits less outside air than drafty older construction, and indoor air pollution in many modern buildings is often much worse than outdoor air pollution. The term "sick-building syndrome" (SBS), has been coined to identify this problem. Concern about SBS has given new impetus to indoor horticulture.

Various aids to tending plants indoors have been developed. There is for example a light source mounted on a telescopic support that can be extended as the plant grows, thereby keeping the light source close to the top of the plant as it grows. There are also various lighted containers within which plants can be fully enclosed. There have also been proposals for automatic irrigation or watering of outdoor and indoor plants and automatic illumination of plants.

However, there has not heretofore been provided a unitary structure capable of tending plants for extended periods without any human intervention.

An important part of plant tending is supplying sufficient light. If a plant is outdoors, this presents no problem. However, if the plant is indoors, it must be placed near a window and/or it must be supplied with additional light from an artificial light source. While light from an artificial light source can be used in dark areas of a room to supply some of the energy required for photosynthesis, incandescent light is insufficient in the range of its spectrum and too hot to be placed near the foliage because of the potential for burning the foliage. While fluorescent light is more suitable for illuminating foliage, heretofore only long bulbs with end prongs have been available, and such bulbs are usually used for a number of potted plants. Now it has been found that the new low-wattage but bright screw-in type of fluorescent bulb can be mounted in close proximity to individual plants without fear of foliage burn. Furthermore, it is possible to apply tinted heat-resistant dye coatings to the fluorescent bulb to help attain the proper spectrum required for plant growth. In order to bring the potted plant into closer proximity to the light, movable and slidable arm trays or wire hooks placed on a vertical pole can be positioned close to a suitable individual fluorescent reflective fixture. The fixture can be held by an adjustable arm that allows rotary movement as well as vertical movement and radial movement (i.e. the arm itself can be adjustable).

While the use of fluorescent tubes to supply light for plants is not new, it has been limited to horizontal structures where the fluorescent tube size dictated the design of the entire lighting mechanism. This handicap is overcome in accordance with the present invention by virtue of its mobility and adjustability.

Another option for watering plants involves the use of a reservoir having superabsorbent polymers. This is especially useful when going on vacation since the polymers can absorb as much as 300 times their weight in water and can last four to five years. While it is necessary to water the roots of plants when the soil becomes dry, usually manual watering is carried out. An improvement for feeding plants provided in accordance with the invention can be used over extended periods of time, as during vacations when no one is present to water the plants.

OBJECTS AND SUMMARY OF THE INVENTION

An object of the invention is to provide a plant tender that remedies the shortcomings of earlier plant tenders and in particular to provide a plant tender that can tend plants for extended periods without any human intervention.

Another object of the invention is to provide a plant tender that enables plant owners to take long vacations and otherwise absent themselves from their homes and workplaces without needing to arrange with a friend or a commercial service to tend their plants in their absence.

Another object of the invention is to provide a plant tender that can be enlisted in the battle against SBS.

Another object of the invention is to encourage the spread of indoor horticulture for its intrinsic aesthetic value.

These and other objects are attained in accordance with the invention by providing a plant tender for delivering light to the foliage and water and nutrients to the roots of a plant growing in a container and embedded in an anchoring medium contained in the container, the plant tender comprising: an armature positioned adjacent to the plant and formed with conduit means for electrical power; a reservoir in physical contact with at least one of the container, armature and anchoring medium for supplying the water and nutrients to the roots; an artificial light force supported by the armature for irradiating the foliage; and control means for establishing a duty cycle of the light source and for controlling both the duty cycle and the delivery of water and nutrients.

BRIEF DESCRIPTION OF THE DRAWING

A better understanding of the objects, features and advantages of the invention can be gained from a consideration of the following detailed description of the preferred embodiments of the invention, in conjunction with the appended figures of the drawing, wherein corresponding reference characters refer to corresponding elements or parts, and wherein.

DESCRIPTION OF THE PREFERRED EMBODIMENTS

Figure 1:
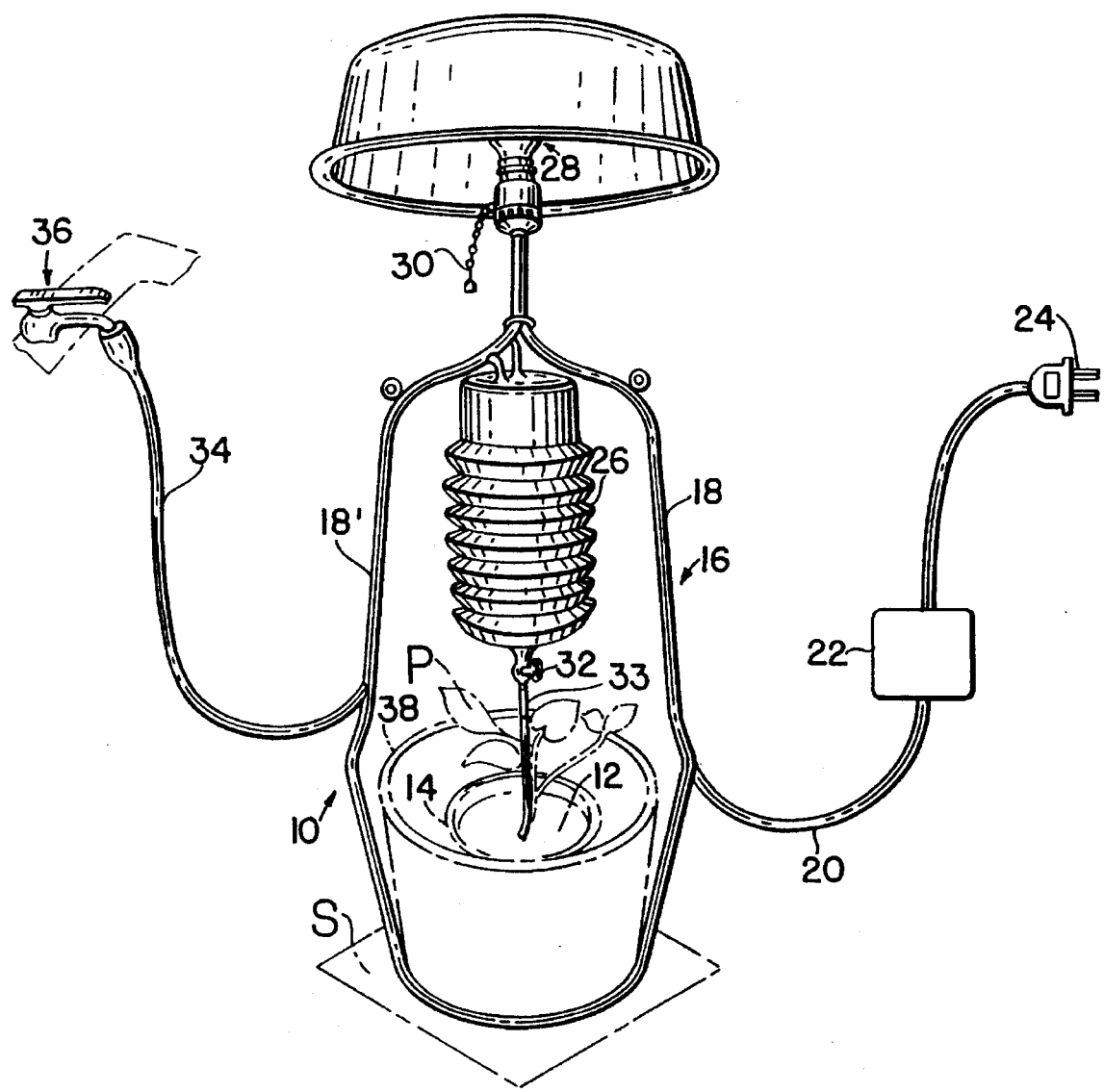
FIG. 1 is a perspective view of a first embodiment of a plant tender constructed in accordance with the invention.

FIG. 1 is a perspective view of a first embodiment of a plant tender constructed in accordance with the invention. The plant tender 10 of FIG. 1 delivers light to the foliage and water and nutrients to the roots of a plant P embedded in an anchoring medium 12 contained in a container 14.

The plant tender 10 comprises an armature 16 positioned adjacent to the plant P and formed with a conduit 18 for electrical power. The armature 16 is made of stainless steel or a rigid plastic such as polyvinyl chloride or a polyolefin. The electrical power is supplied through a line 20 connected through a timer 22 to a plug 24 that can be inserted into a household electrical outlet.

A reservoir 26 is positioned adjacent to the plant P and is in physical contact with at least one of the container 14, the armature 16, and the anchoring medium 12. In FIG. 1, the reservoir 26 is in physical contact with the armature 16. The reservoir supplies water and nutrients to the roots of the plant as described below. The reservoir 26 has a corrugated exterior, which facilitates adherence thereto of certain plants, including climbers.

Also in accordance with the invention, an artificial light source 28, for example an incandescent bulb having a conventional shade, is supported by the armature 16 for irradiating the plant P or other foliage tended by the plant tender.

In accordance with the invention, control means is provided for establishing a duty cycle of the light source and for controlling both the duty cycle and the delivery of water and nutrients. In the embodiment of FIG. 1, the duty cycle of the light source 28 is established by the timer 22. A switch controlled for example by a conventional pull chain 30 is left permanently closed, and the plug 24 is left permanently inserted in its socket. The power to the light source 28 is thus controlled by the timer 22, which controls a switch that is cycled between open and closed states in accordance with a predetermined program selected by a user of the apparatus. As an example, the light source 28 may have a fifty percent duty cycle and a period of 24 hours. That is, the light source 28 irradiates the plant P for a period of 12 hours and then turns off for a period of 12 hours.

If the plant P is in a windowless room, the duty cycle of the light source need not be in phase with day and night. If the plant tender 10 and plant P are in a room with a window so that the plant P receives a significant amount of natural light, it may, in the case of some plants, be desirable to establish a duty cycle of the light source 28 which is in phase with the natural day-night cycle, so that, during daylight hours, the light received by the plant P is augmented by the artificial light source 28, and, during the hours of darkness, the artificial light source 28 is turned off.

Of course, the requirements for light depend on the characteristics of the individual plant, and those experienced in growing plants will have no difficulty in establishing a proper duty cycle for the light source 28 and, if appropriate, a suitable phase relationship between the duty cycle on the one hand and the natural alternation between daylight and darkness on the other.

Note that if the duty cycle of the light source has a period other than 24 hours, its phase relationship with the natural cycle of daylight and darkness will vary.

As indicated above, decisions about the duty cycle and its period are not critical to the present invention, it being understood that each plant has its own requirements and that those skilled in the art of growing plants will readily establish the correct parameters.

FIG. 1 also discloses means for controlling the delivery of water and nutrients to the plant P. Specifically, a petcock or adjustable valve 32 drips water and nutrients dissolved in the water at a controllable rate through a flexible tube 33 long enough to reach or substantially reach the anchoring medium and into the container 14 for the plant P. The flexible tube 33 is preferably employed in cases where, because of the location of the petcock, the water would otherwise be discharged at a substantial height above the anchoring medium. The use of the flexible tube 33 in such cases prevents the water from splashing off the leaves of the plant and insures delivery of the water and nutrients to the plant roots. In other embodiments described below, no flexible tube is needed.

The reservoir is replenished by a line 34 connected to a source 36. The source 36 is preferably a low-pressure source in the embodiment of FIG. 1, so that the rate of flow of water and nutrients can be controlled by the petcock 32. If the source 36 is at high pressure, it becomes difficult to balance the flow from the source into the reservoir 26 and the flow out of the reservoir 26 through the petcock 32. In such a case, therefore, there may be provided a timer (not shown) for controlling the source 36 to admit water into the reservoir 26 when the reservoir reaches a low level as determined by a first sensor in the reservoir and to shut off the source 36 when the water in the reservoir reaches a high level as determined by a second sensor in the reservoir 26. With this provision, the apparatus of FIG. 1 can safely be connected to a high-pressure source, and the rate of delivery of water and nutrients can be determined by the petcock 32.

The armature 16 is provided in the embodiment of FIG. 1 with a hollow conduit 18' for the water line 34.

An additional container 38 is provided around the container 14 to provide security against accidental spills, etc. The armature 16 encircles the second container 38 at the bottom, and the entire apparatus is placed on a support S such as a table top or floor.

Figure 2:
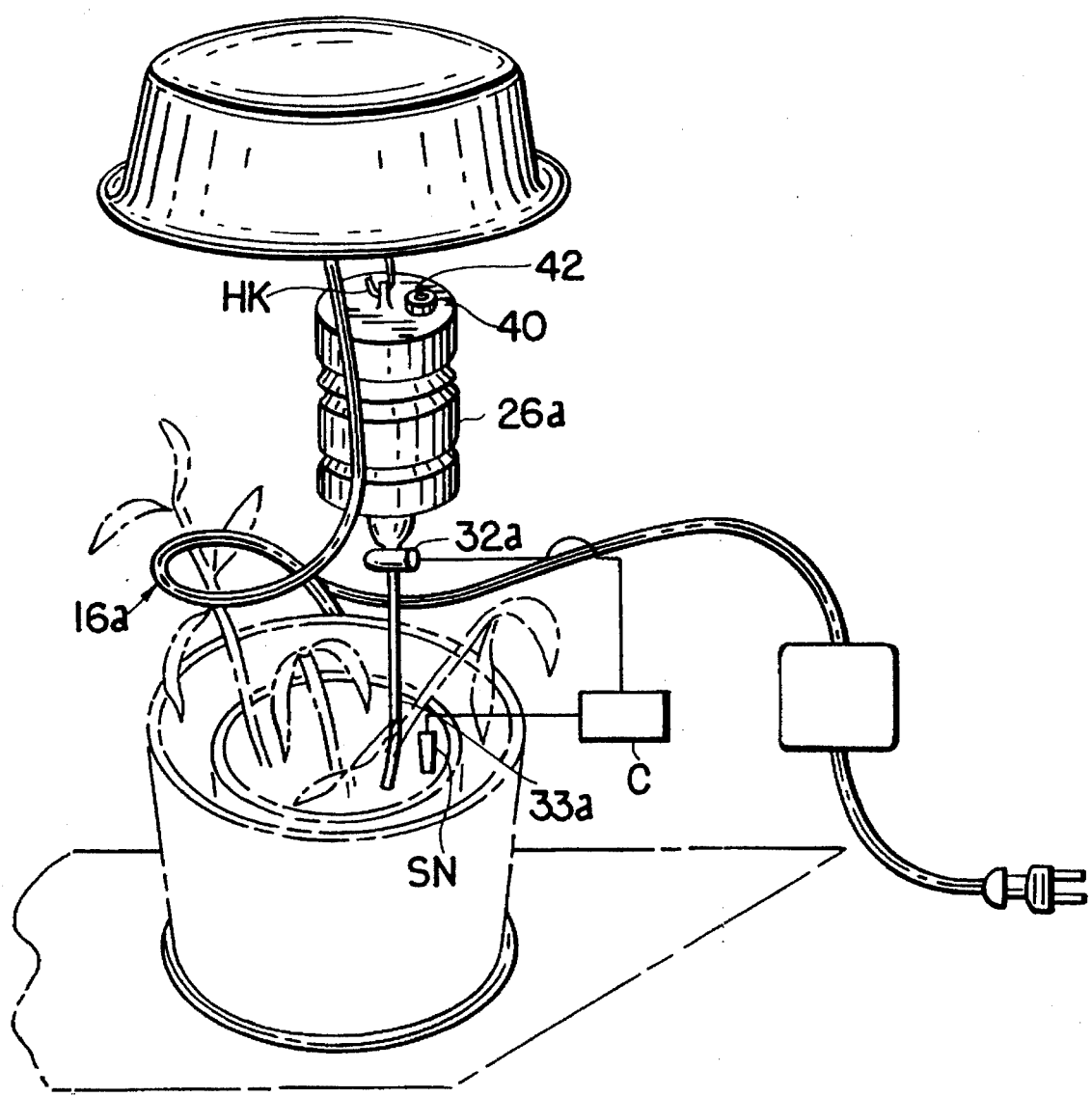
FIG. 2 is a perspective view of a second embodiment of a plant tender constructed in accordance with the invention.

The embodiment of FIG. 2 is similar to that of FIG. 1 except in several respects described below. First the armature 16a is shaped differently to produce a different aesthetic affect and constructed so that it can be reshaped to vary its height, and the reservoir 26a is not connected to a source but is provided with a screw cap 40 which can be unscrewed so that water containing a solution of nutrients can be poured into the reservoir 26a. This embodiment is perfectly satisfactory provided that the reservoir 26a is large enough to enable the apparatus to tend the plant during the longest anticipated absence of the owner. This is a calculation easily made by the owner, who will normally know how much water is required by the plant over a period of, say, one week, and can then select a reservoir large enough to enable the plant to be tended automatically during the longest projected absence of the owner. The embodiment of FIG. 2 can be sold with reservoirs of different sizes and purchased by consumers on the basis of their own schedules and the needs of the plants to be tended.

Wherever needed, an air hole is provided to enable the water with its solution of nutrients to flow through the petcock. For example, in the embodiment of FIG. 2, an air hole 42 is provided in the cap 40. Of course, it is within the scope of the invention to place an air hole in any other location where it can perform its intended function, for example elsewhere on the top of the container 26a.

The reservoir 26a is suspended from the armature by a hook HK. Thus, in the embodiment of FIG. 2 as in that of FIG. 1, the reservoir 26a is in physical contact with the armature.

The embodiment of FIG. 2 differs from that of FIG. 1 in the further respect that the embodiment of FIG. 2 includes a sensor SN or moisture meter in communication with the anchoring medium and connected to a controller C. The petcock 32 of FIG. 1 is replaced in FIG. 2 by a solenoid-controlled valve 32a, and the controller C is connected to the valve 32a to cycle the valve 32a between open and closed states in accordance with the moisture content of the anchoring medium as determined by the sensor SN. Thus a relatively dry condition of the anchoring medium is detected by the sensor SN which sends an appropriate signal to the controller C. The controller C decodes this signal and sends a control signal in response thereto to the solenoid valve 32a, opening the valve 32a to admit water to the anchoring medium. When the sensor SN determines that the anchoring medium has reached a requisite moisture level, it sends a signal to the controller C that is decoded by the controller C. The controller C then sends a control signal to the valve 32a that causes the valve to shut off the flow of water and nutrients to the anchoring medium.

Moisture meters are conventional and well understood by those skilled in the art. They are available commercially, as are microprocessors and other controllers that can respond to signals from the sensor S and generate control signals in response thereto. Solenoid valves are of course also conventional, well understood by those skilled in the art, and available from commercial sources.

The precise moisture reading that actuates the valve to go to the open and closed states will of course depend on the needs of the particular plant, which are readily determinable by users of the plant tender.

Figure 3:
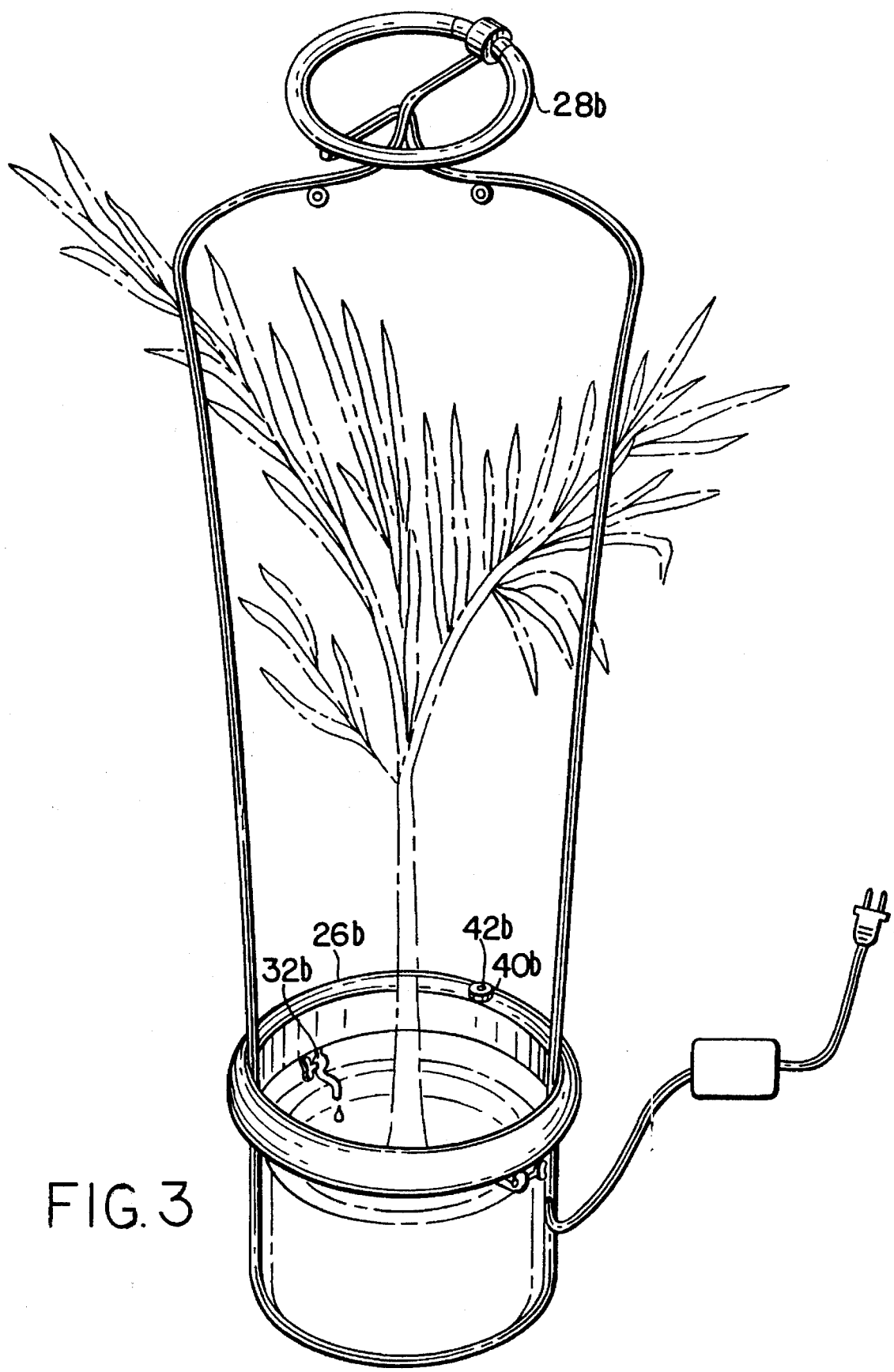
FIG. 3 is a perspective view of a third embodiment of a plant tender constructed in accordance with the invention.

In the embodiment of FIG. 3, the reservoir 26b rests on the container for the plant and its anchoring medium and can be either a separate unit or constructed integrally with the container. Petcocks 32b placed at intervals around the lower part of the reservoir 26b enable water with its solution of nutrients to be distributed under the influence of gravity at a controlled rate to the plant. A filling cap 40b provided with an air hole 42b enables water and dissolved nutrients to be introduced into the reservoir 26b.

Again in the embodiment of FIG. 3, the size of the reservoir can be adjusted in accordance with the needs of the plant.

In the embodiment of FIG. 3, the light source 28b is a fluorescent lamp, which may be preferred to an incandescent lamp because its spectrum of light may be better suited to the needs of the particular plant being tended.

Figure 4:
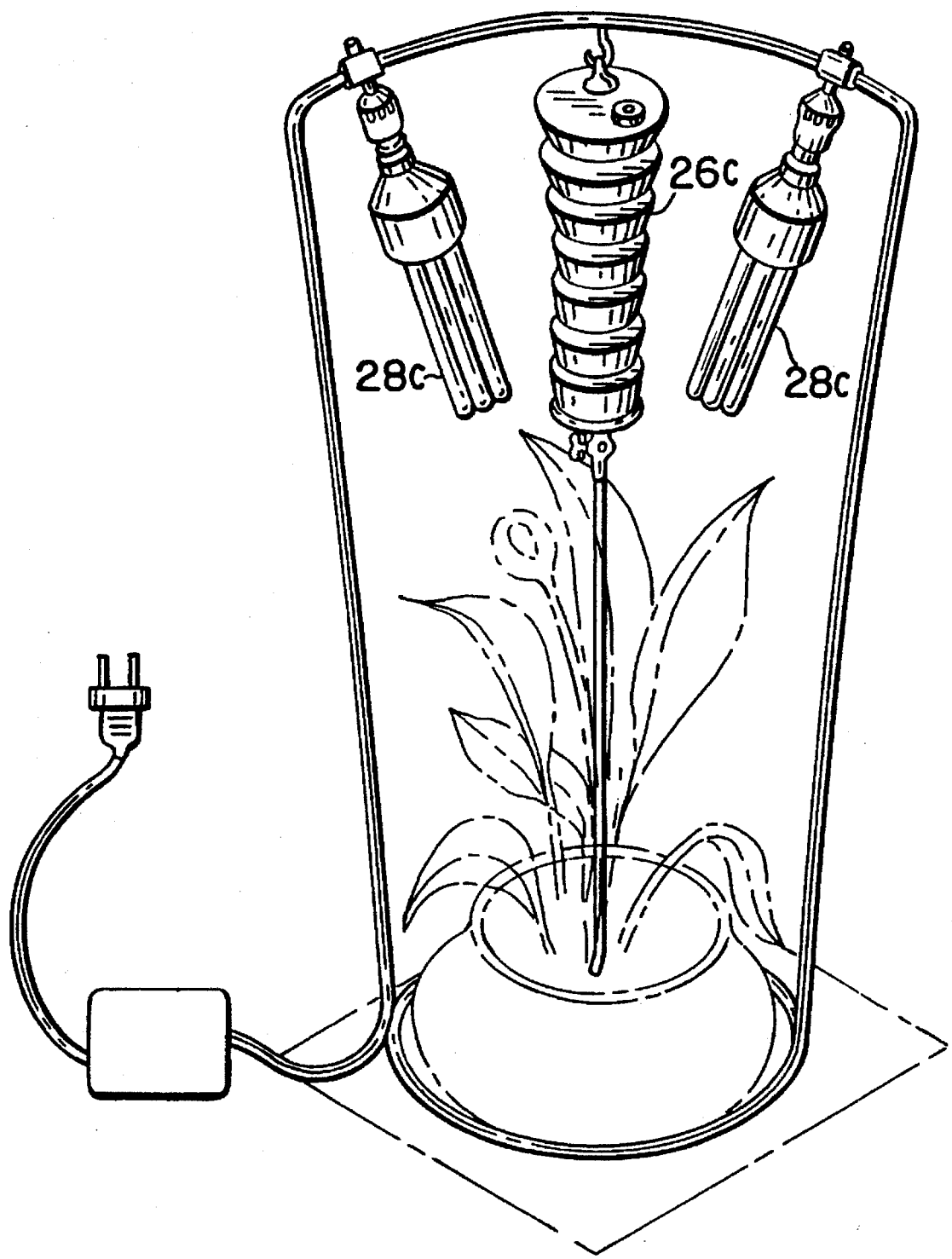
FIG. 4 is a perspective view of a fourth embodiment of a plant tender constructed in accordance with the invention.

The embodiment of FIG. 4 is particularly advantageous in that it employs the recently developed screw-in-type fluorescent lamps 28c that are long lasting and consume little electricity in proportion to their light output. The reservoir 26c is of a different shape and design as compared to the reservoirs described previously but accomplishes the same purpose in a very satisfactory manner.

Figure 5:
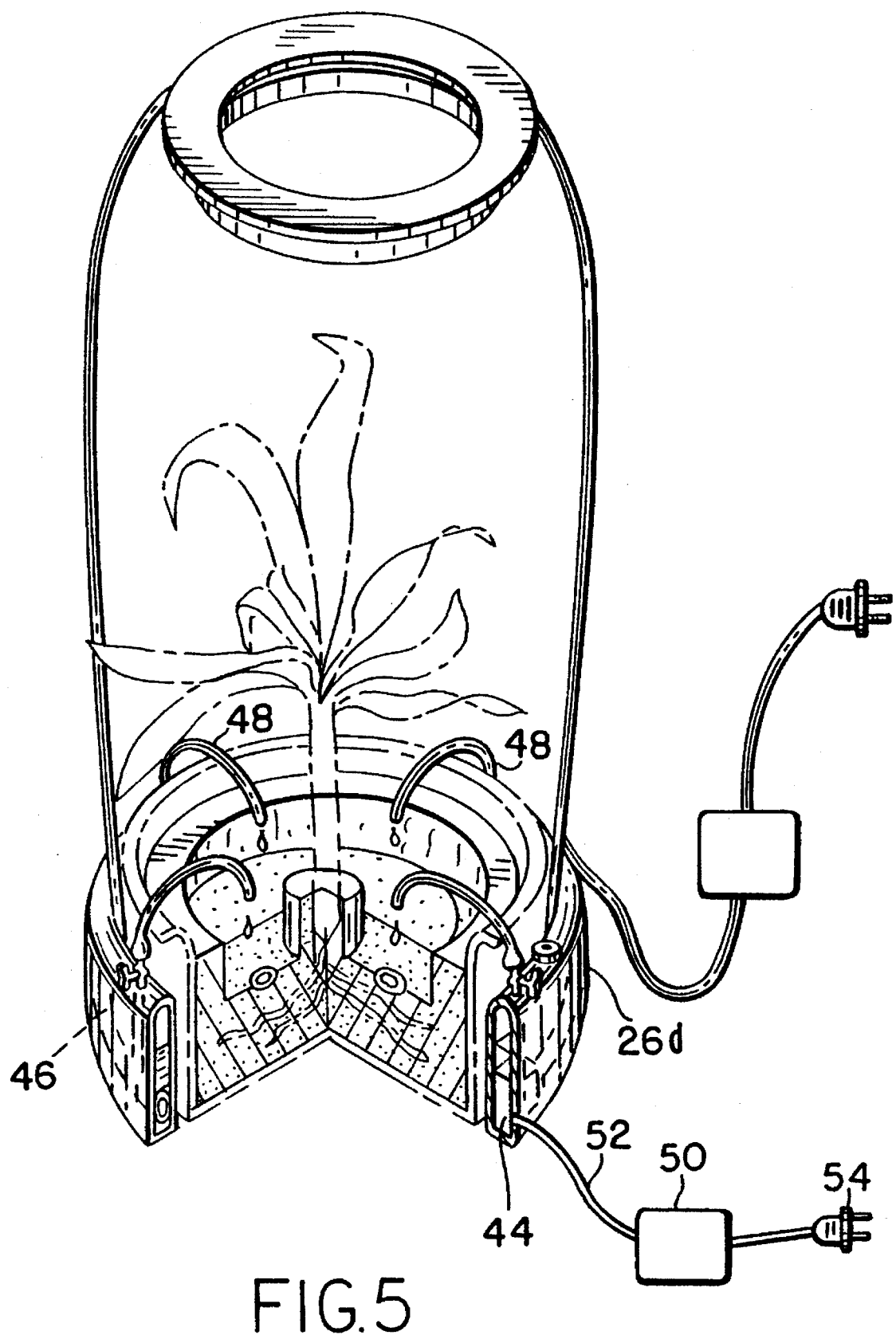
FIG. 5 is a perspective view of a fifth embodiment of a plant tender constructed in accordance with the invention.

In the embodiment of FIG. 5, a reservoir 26d is provided on the outside of the container for the plant. It can alternatively be provided on the inside or constructed integrally with the container. As the embodiment of FIG. 5 illustrates, it is not necessary in accordance with the invention to employ a gravity feed in order to distribute water and nutrients to the plant. In the embodiment of FIG. 5, a pump 44 is mounted on the lower portion of the reservoir 26d. A line 46 extends around the doughnut-shaped reservoir 26d, and upstanding discharge lines 48 are connected to the line 46. The pump takes in water with dissolved nutrients from the bottom of the reservoir 26d and pumps it through the line 46 so that it is ejected from the lines 48. In this case, no petcock is required, because a timer 50 in a line 52 is connected to a plug 54 which goes to a separate household electrical socket so that the timer 50 turns on to operate the pump 44 to discharge water and dissolved nutrients on a timed cycle which in principle may be, but in practice normally is not, the same as the cycle of irradiation by the light source. The light source, being annular, enables the plant to grow through the annulus of the bulb.

Figure 6:
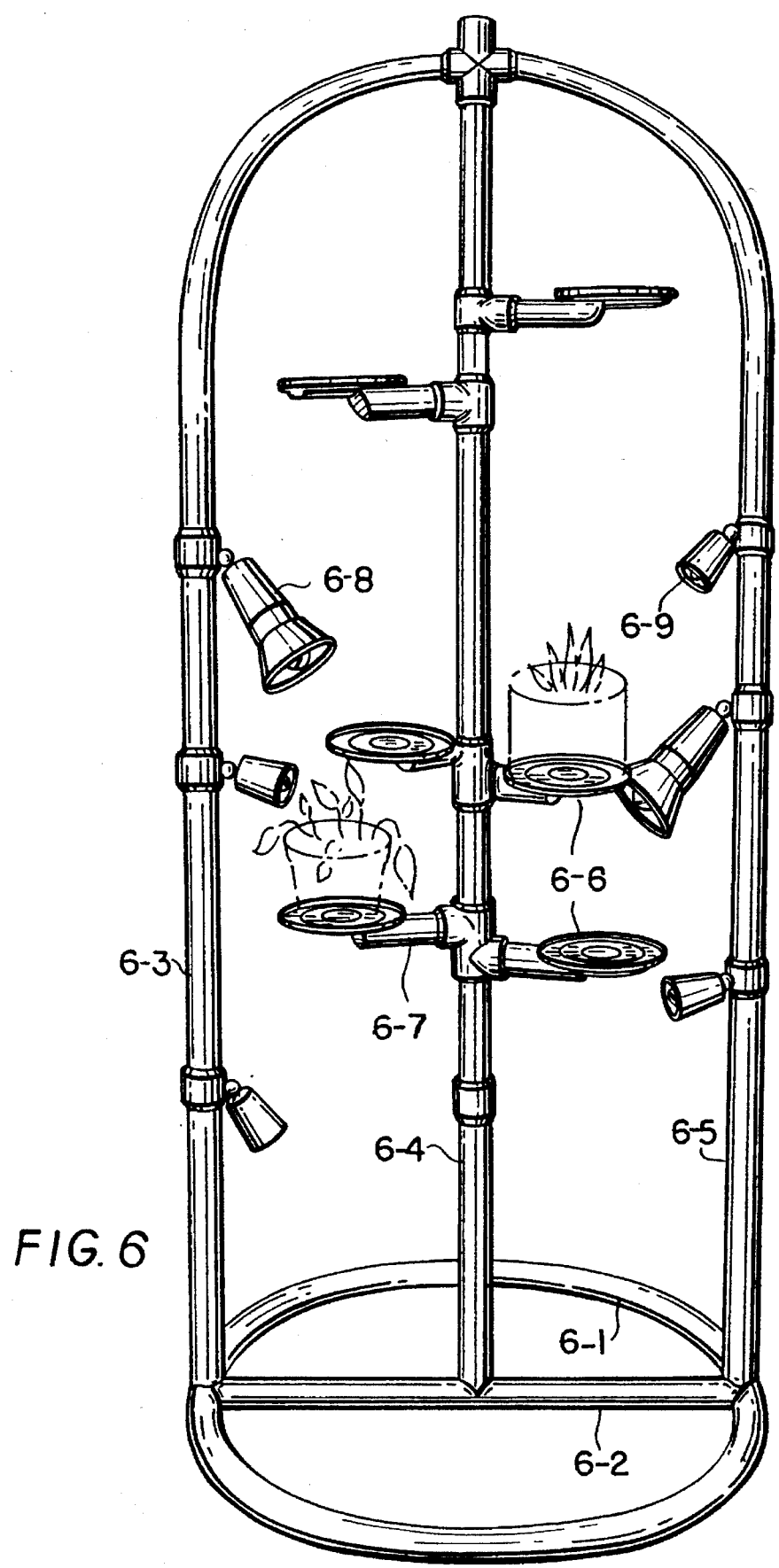
FIG. 6 is a perspective view of a sixth embodiment of the invention.

FIG. 6 shows a sixth embodiment of the invention. Broadly speaking, in this embodiment, a display device is provided comprising vertical support means and secondary support means connected to the vertical support means for displaying an item. Illumination means is connected to the vertical support means for illuminating the displayed item. At least one of the secondary support means and the illumination means is adjustable in position vertically, radially, and angularly with respect to the vertical support means.

More particularly, in FIG. 6, a circular base 6-1 has a diameter tube 6-2 and supports upright members 6-3, 6-4, and 6-5. The uprights meet at the top of the structure. The center upright 6-4 has holders 6-6 supported by arms 6-7. The uprights 6-3 and 6-5 support lights 6-8 and 6-9. Plants, bric-a-brac, etc., can be displayed on the plates 6-6 and illuminated by the lamps 6-8, 6-9.

The entire structure is optionally and preferably made adjustable. In particular, the arms 6-7 can be adjusted up and down on the support 6-4 and can have telescoping adjustments so that the plates 6-6 can be made closer to or farther from the support 6-4. The arms 6-7 can also be pivoted angularly about the support 6-4. The lights 6-8 and 6-9 may optionally be similarly adjustable and in particular can be made to swivel.

By this combination of features, it is possible to position the lights optimally relative to the plants or other items on display.

Figure 7:
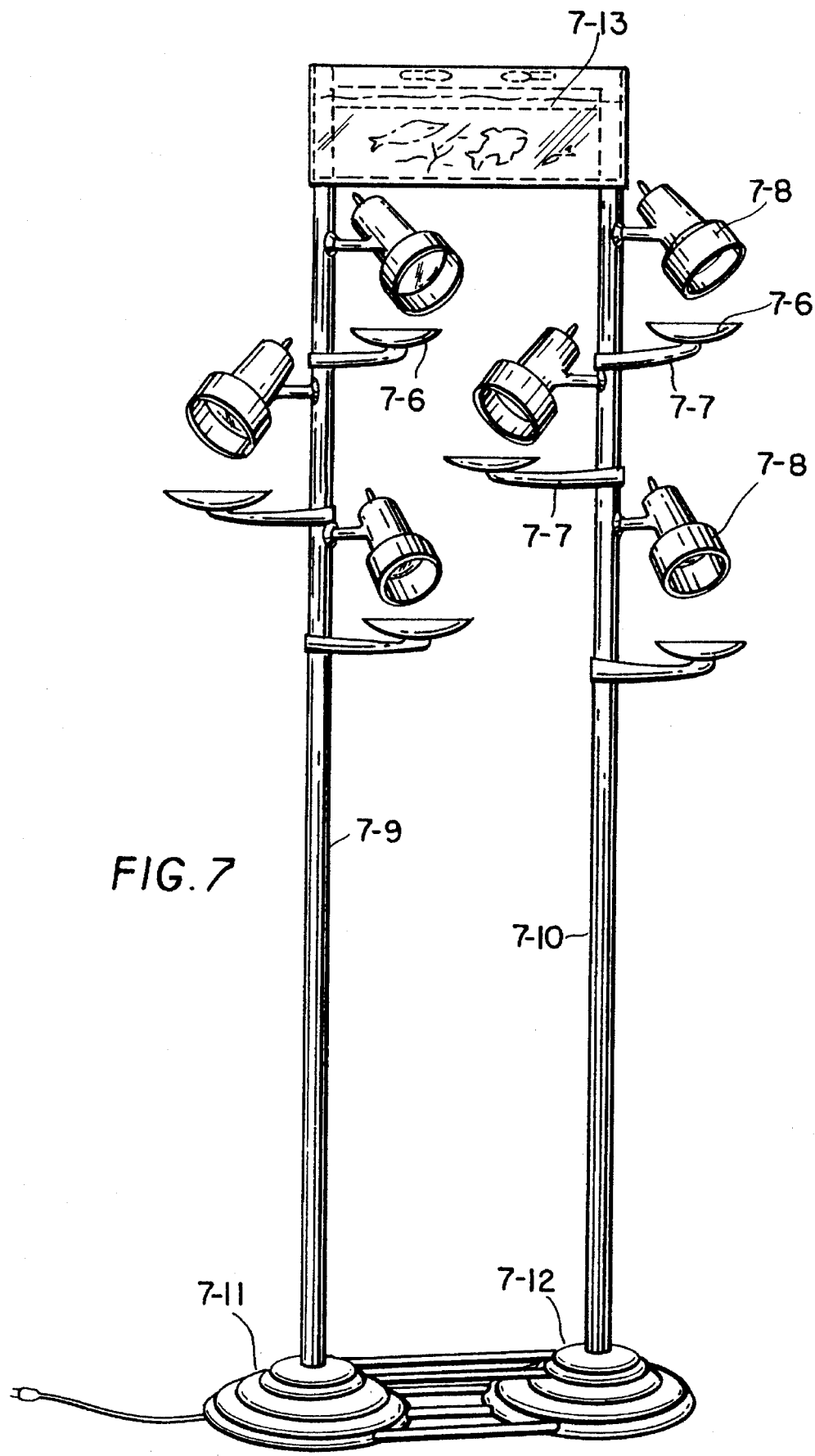
FIG. 7 is a perspective view of a seventh embodiment of the invention.

FIG. 7 shows a seventh embodiment of the invention. In this embodiment, a display device is provided comprising vertical support means and a fish tank supported by the vertical support means. Secondary support means is supported by the vertical support means for supporting an item to be displayed. Illumination means is also supported by the vertical support means for illuminating the item. From another standpoint, FIG. 7 discloses a method of growing and displaying flora and fauna comprising the steps of providing a unitary display device for displaying the flora and fauna in close proximity to each other and feeding the flora with waste products produced by the fauna. Preferably, as illustrated in FIG. 7, the fauna comprises fish.

More particularly, in FIG. 7, arms 7-7 support plates 7-6 for displaying items and lamps 7-8 are provided for illumination. All of this is supported by uprights 7-9 and 7-10 that rise from base members 7-11 and 7-12, respectively.

At the top of the structure a fish tank 7-13 is mounted. The fish tank 7-13 contains water, fish, and the other usual accoutrements of an aquarium. The waste products of the fish can be employed to fertilize the plants by using the watering system disclosed above (not specifically illustrated in FIG. 7). A fresh supply of water for the fish tank 7-13 can be provided automatically using the principles described above.

This provides a display that is attractive and that can be left unattended for long periods even though it may incorporate animal and plant life.

In the embodiments of FIGS. 6 and 7, various "reversals" can of course be made. For example, in FIG. 6, the lamps can be placed on the center support and the plants or bric-a-brac can be displayed supported by the outer supports 6-3 and 6-5; and, of course, the number of uprights employed is optional in both FIGS. 6 and 7.

Figure 8:
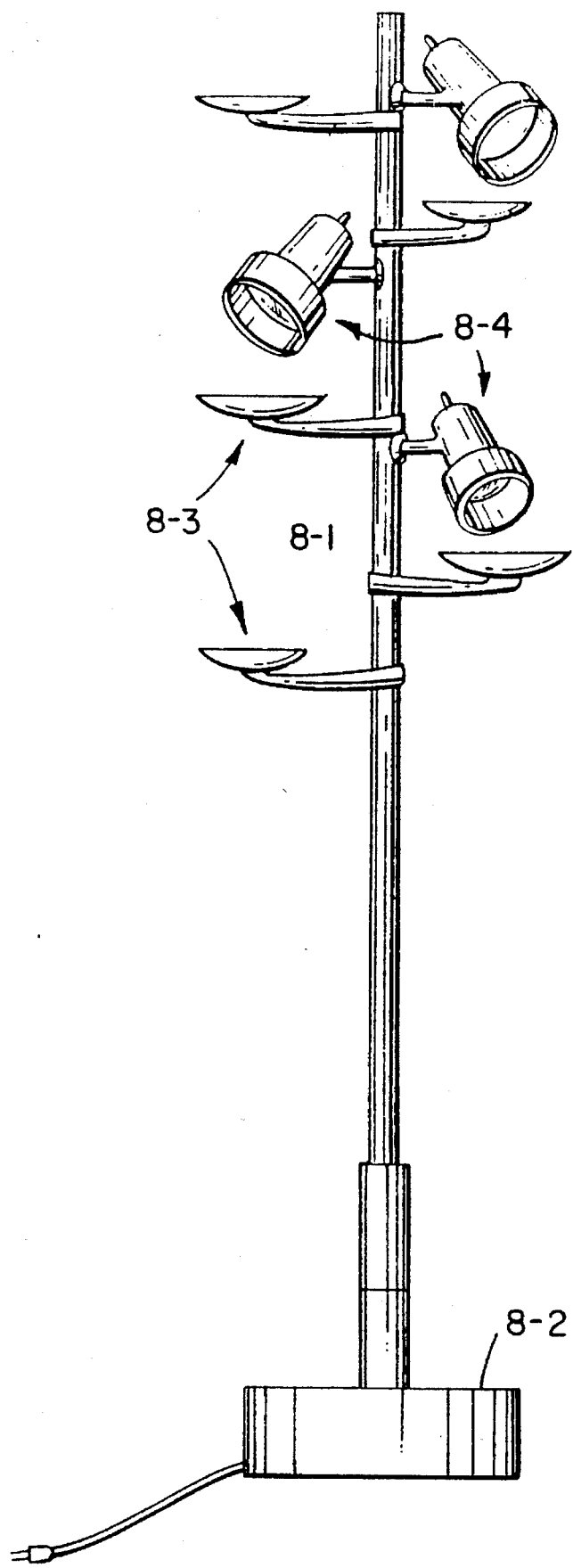
FIG. 8 is a perspective view of an eighth embodiment of the invention.

FIG. 8 is a perspective view of an eighth embodiment of the invention employing only a single vertically extending support 8-1. It rises from a base 8-2, carries vertically sliding, horizontally extending arm plates 8-3 that can support items for display, and carries adjustable illumination devices 8-4 for illuminating the displayed items. The arm plates are capable of 360° rotation about the vertical support 8-1.

Figure 9:
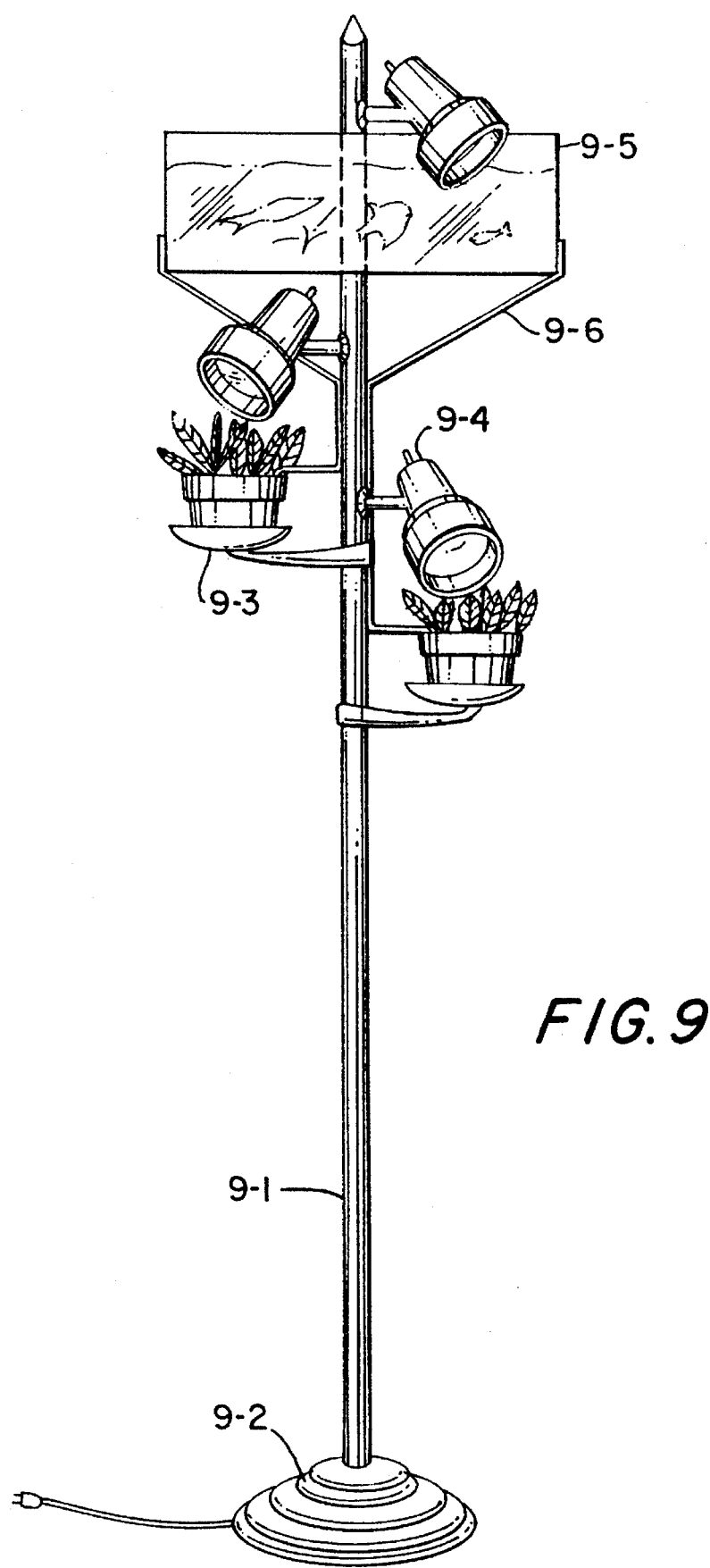
FIG. 9 is a perspective view of a ninth embodiment of the invention.

FIG. 9 is a perspective view of a ninth embodiment of the invention wherein a single vertically extending support 9-1 rises from a base 9-2 and has vertically sliding, horizontally extending arm plates 9-3 and adjustable illumination devices 9-4 connected to the vertically extending support 9-1 for illuminating plants displayed on the arm plates 9-3. A fish tank 9-5 is supported near the top of the vertically extending support 9-1 and provides for watering of the plants via lines 9-6. These lines 9-6 can also carry fertilizer derived from the waste products of the fish.

Figure 10:
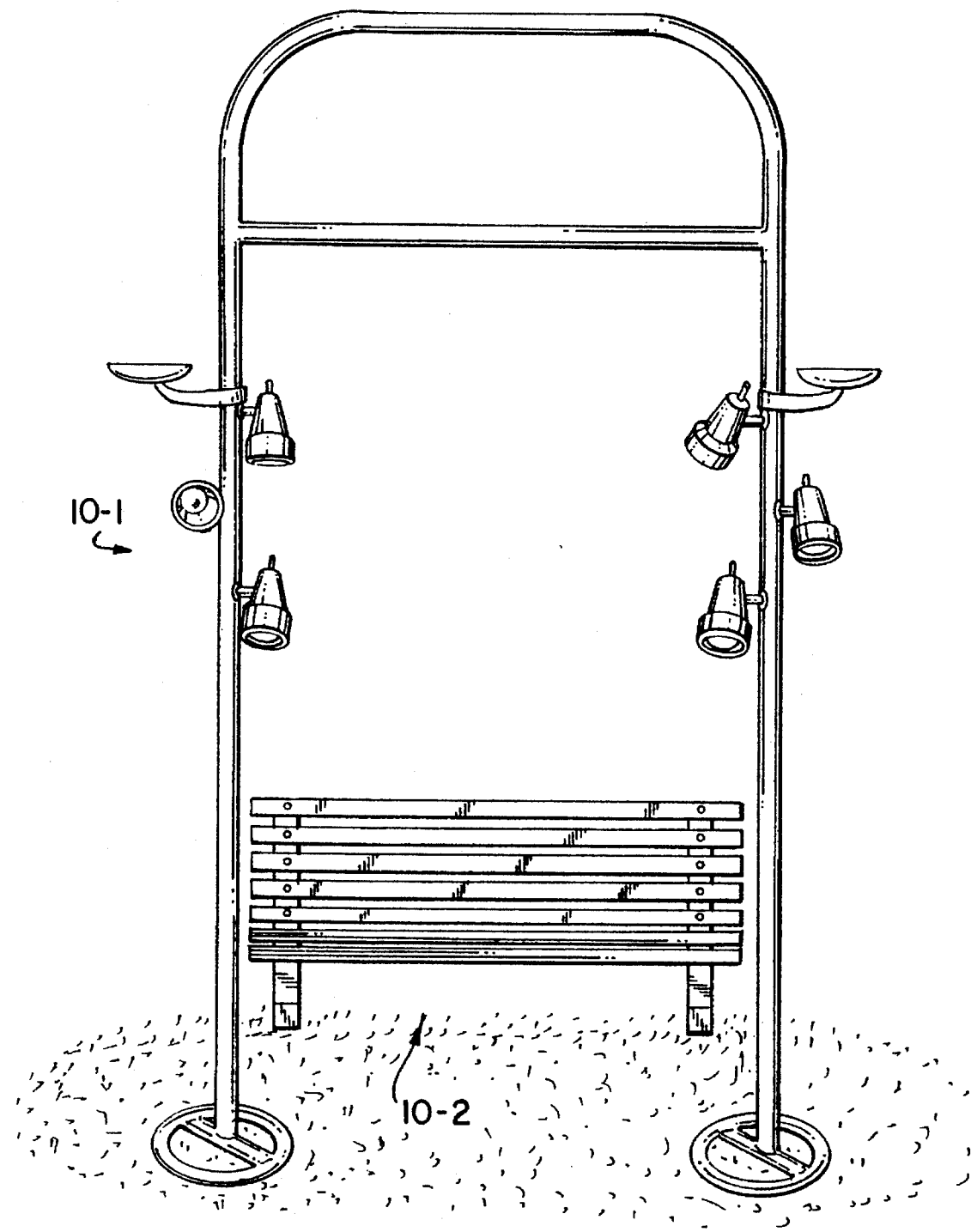
FIG. 10 is a perspective view of a tenth embodiment of the invention.

FIG. 10 discloses a tenth embodiment of the invention forming an outdoor arbor 10-1. A bench 10-2 is provided to make it easy and convenient to enjoy the arbor for an extending period of time.

Figure 11:
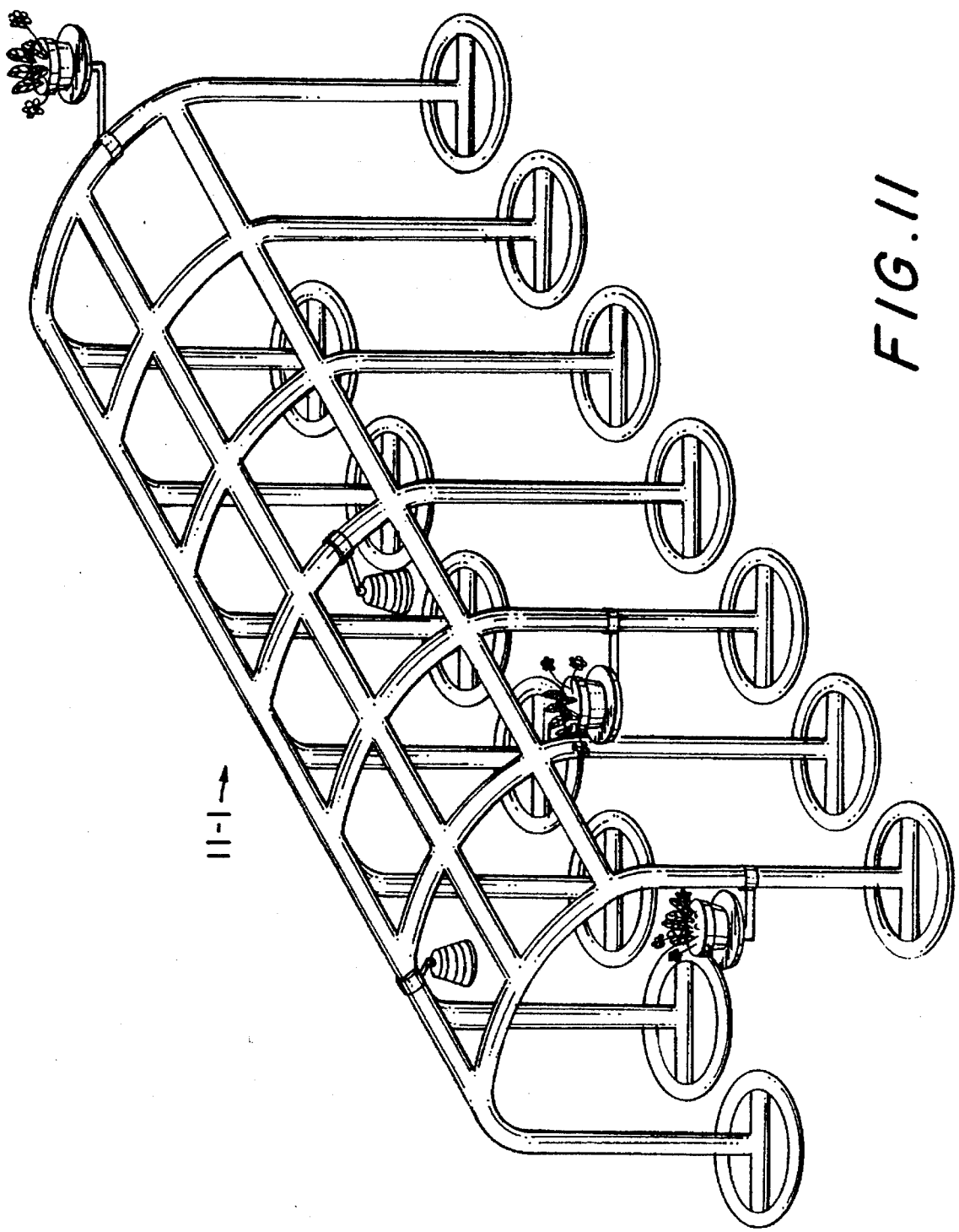
FIG. 11 is a perspective view of an eleventh embodiment of the invention.

FIG. 11 discloses an eleventh embodiment of the invention in the form of a walk-through arbor 11-1. The arbor 11-1 is tall enough so that people can walk through it, and it is preferably wide enough so that two people can walk through side-by-side. The arbor 11-1 can of course be elongated or extended to any desired length by combining multiple units each in the form of an arch, thereby forming an arch over an extended pathway.

Thus there is provided in accordance with the invention a novel and highly effective plant tender that automatically tends plants, especially indoor plants, though it is also within the scope of the invention to employ the plant tender to tend outdoor plants. The invention is advantageous also in displaying items other than plants and even in tending life forms other than plants. Many modifications of the preferred embodiments of the invention disclosed above will readily occur to those skilled in the art. Accordingly, the invention extends to all structure that falls within the scope of the appended claims.

I claim:

1. A unitary plant tender which induces photosynthesis by artificial light and allows for foliage growth, said plant tender comprising:

at least one armature formed with at least one vertically extending elongate hollow member;

a plant tender lamp;

means mounting said lamp on said armature for continuously adjustable vertical and horizontal rotary positioning and for a swivel movement;

electric power leads extending through said hollow member and connected to said lamp;

a plant support for supporting a plant; and means mounting said support on said armature for continuously adjustable vertical and horizontal rotary positioning;

whereby said lamp and said support can optimize photosynthesis and foliage growth through a combination of adjustments of said lamp and said plant support that optimize the intensity and direction of the light flux supplied to said plant.

2. A unitary plant tender according to claim 1 wherein said armature is formed with at least two vertically extending elongate hollow members connected together to form an arch, there being at least one plant tender lamp and at least one plant support mounted on said vertically extending members.

3. A unitary plant tender according to claim 1 wherein said armature is formed with at least four vertically extending elongate hollow members connected together to form a walk-through arbor, there being at least one plant tender lamp and at least one plant support mounted on said vertically extending members.

* * * * *